United States Patent [19]
Doron et al.

[11] Patent Number: 5,857,421
[45] Date of Patent: Jan. 12, 1999

[54] METHOD OF AND MEANS FOR PRODUCING COMBUSTIBLE GASES FROM LOW GRADE FUEL

[75] Inventors: Benjamin Doron, Jerusalem; Daniel Goldman, Tel Aviv; Eli Yaffe, Givatayim, all of Israel

[73] Assignee: Ormat, Inc., Sparks, Nev.

[21] Appl. No.: 628,955

[22] Filed: Apr. 8, 1996

Related U.S. Application Data

[63] Continuation of Ser. No. 318,191, Oct. 5, 1994, Pat. No. 5,505,144, which is a continuation of Ser. No. 181,165, Jan. 13, 1994, abandoned, which is a continuation of Ser. No. 82,821, Jun. 28, 1993, abandoned, which is a continuation of Ser. No. 834,790, Feb. 13, 1992, abandoned, which is a continuation-in-part of Ser. No. 827,274, Jan. 29, 1992, abandoned.

[51] Int. Cl.⁶ ..................................................... F23G 7/00
[52] U.S. Cl. ......................... 110/346; 110/229; 110/234; 110/347; 48/101; 48/210
[58] Field of Search ................................... 110/216, 224, 110/229, 233, 234, 236, 204, 346; 48/101, 210

[56] References Cited

U.S. PATENT DOCUMENTS

| | | |
|---|---|---|
| 2,928,718 | 3/1960 | Berglund et al. . |
| 4,086,962 | 5/1978 | Cha . |
| 4,110,064 | 8/1978 | Vorona et al. . |
| 4,165,717 | 8/1979 | Reh et al. . |
| 4,181,705 | 1/1980 | Gummerman . |
| 4,185,080 | 1/1980 | Rechmeier . |
| 4,211,606 | 7/1980 | Ponomarev et al. . |
| 4,326,471 | 4/1982 | Rohrbach et al. ................... 110/229 X |
| 4,373,454 | 2/1983 | Pitrolo et al. . |
| 4,388,877 | 6/1983 | Molayem . |
| 4,432,290 | 2/1984 | Ishii et al. . |
| 4,544,478 | 10/1985 | Kelley . |
| 4,601,657 | 7/1986 | Henin et al. . |
| 4,648,965 | 3/1987 | McMath . |
| 4,700,639 | 10/1987 | Esterson et al. . |
| 4,917,024 | 4/1990 | Marten et al. . |
| 4,961,756 | 10/1990 | Rich . |
| 4,981,667 | 1/1991 | Berg et al. . |
| 5,290,327 | 3/1994 | Rossle ................................. 110/229 X |
| 5,372,708 | 12/1994 | Gwertz . |
| 5,388,534 | 2/1995 | Doron et al. ......................... 110/229 X |
| 5,501,160 | 3/1996 | Goldman et al. ........................ 110/229 |

FOREIGN PATENT DOCUMENTS

| | | |
|---|---|---|
| 0184847 | 6/1986 | European Pat. Off. . |
| 1550308 | 11/1967 | France . |
| 3426879 | 1/1986 | Germany . |
| 68149 | 3/1983 | Israel . |
| 544826 | 4/1977 | U.S.S.R. . |
| WO 84/03516 | 9/1984 | WIPO . |
| WO 91/04310 | 4/1991 | WIPO . |

OTHER PUBLICATIONS

*Combustion of Solid Fuel in Air–Fluidized Bed* V.A. Borodulya et al. published in 1980, "Nauka i Tekhnika", Minsk (English Translation).
*Protection of Water and Air Basisns from Effluents of Heat Electric Stations* L.A. Rikhter et al. published 1981, "Energoizdat", Moscow (English Translation).

(List continued on next page.)

*Primary Examiner*—Henry A. Bennett
*Assistant Examiner*—Susanne C. Tinker
*Attorney, Agent, or Firm*—Donald M. Sandler

[57] ABSTRACT

Combustible gases from a solid fuel are produced by pyrolyzing the fuel in a pyrolyzer which also produces carbonaceous material. The carbonaceous material from the pyrolyzer is combusted in a furnace to produce combustion products that include hot flue gases and ash particulate. The combustion products are separated into a plurality of streams, one of which contains flue gases, and another of which contains hot ash which is directed into the pyrolyzer. Finally, the stream of flue gases from the furnace is used to dry the fuel that is supplied to said pyrolyzer.

10 Claims, 3 Drawing Sheets

OTHER PUBLICATIONS

*Institute of Energy: 51st Melchett Lecture—Clean Combustion of Coal, Research and Applications, An Overview of Recent Developments in the USA* J.M. Beer, "Journal of the Institute of Energy", vol. LVIII, pp. 157–212, Dec., 1985.

*Simultaneous reduction of NOx and SO2 in pulverized coal flames by application of staged combustion and direct injection of lime* G. Flament et al., "International Chemical Engineering", vol. 24, No. 2, Apr., 1984, pp. 288–301.

*The application of direct limestone injection to UK power stations* N.A. Burdett et al., "Journal of the Institute of Energy". vol. LVII, Mar., 1985 pp. 64–69.

Chemical Abstracts, vol. 96, 1982, p. 192.

*Thermal Dissolution of Baltic Combustible Shales in a flow–through apparatus* A.B. Voll–Epshtein et al., Khimiye Tverdogo Topliva, vol. 14, No. 2, 1980 pp. 67–70 (English translation).

*Handbook for Working With Oil Shale* Edited by M.G. Rudina and N.D. Serebyanikov, published in 1988 by Leningrad Chemia, pp. 74–76 and 174 in Russian with translation.

*Generation of Energy From Oil Shale of Israel: The Genesis Project* by G. Esterson et al., The Energy Center, The Hebrew University, Sep., 1984, p. 40.

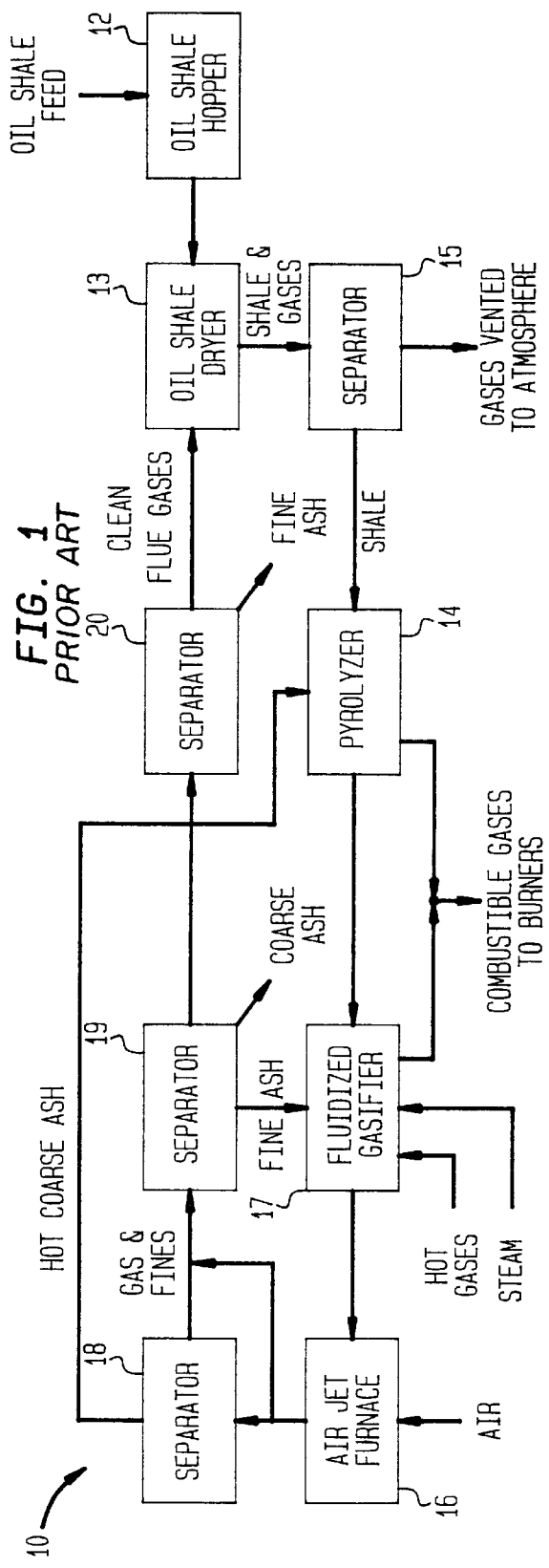
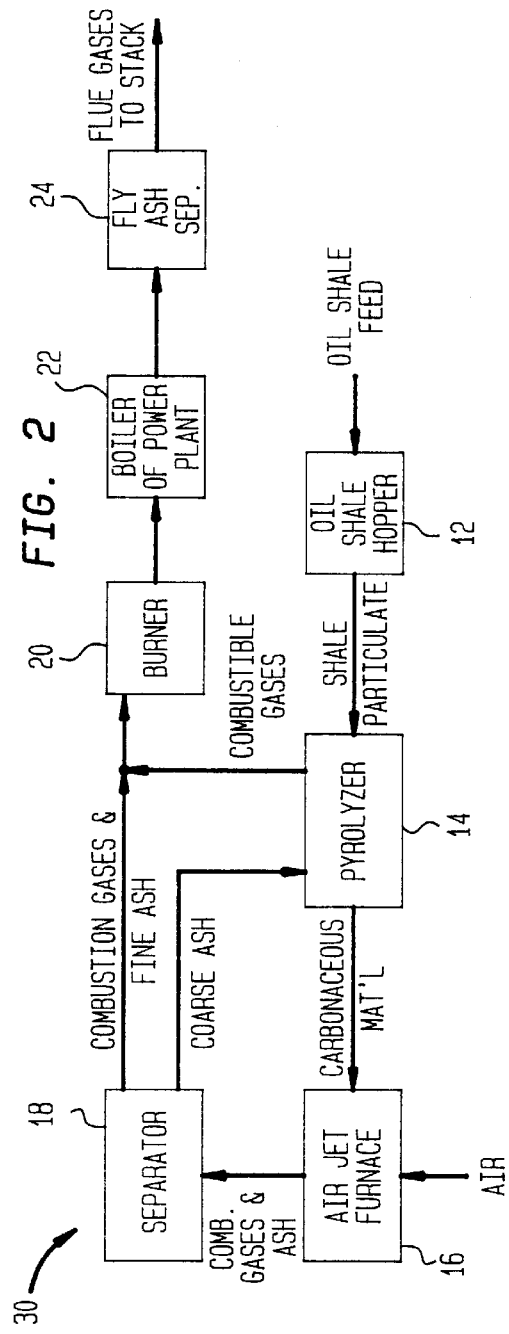

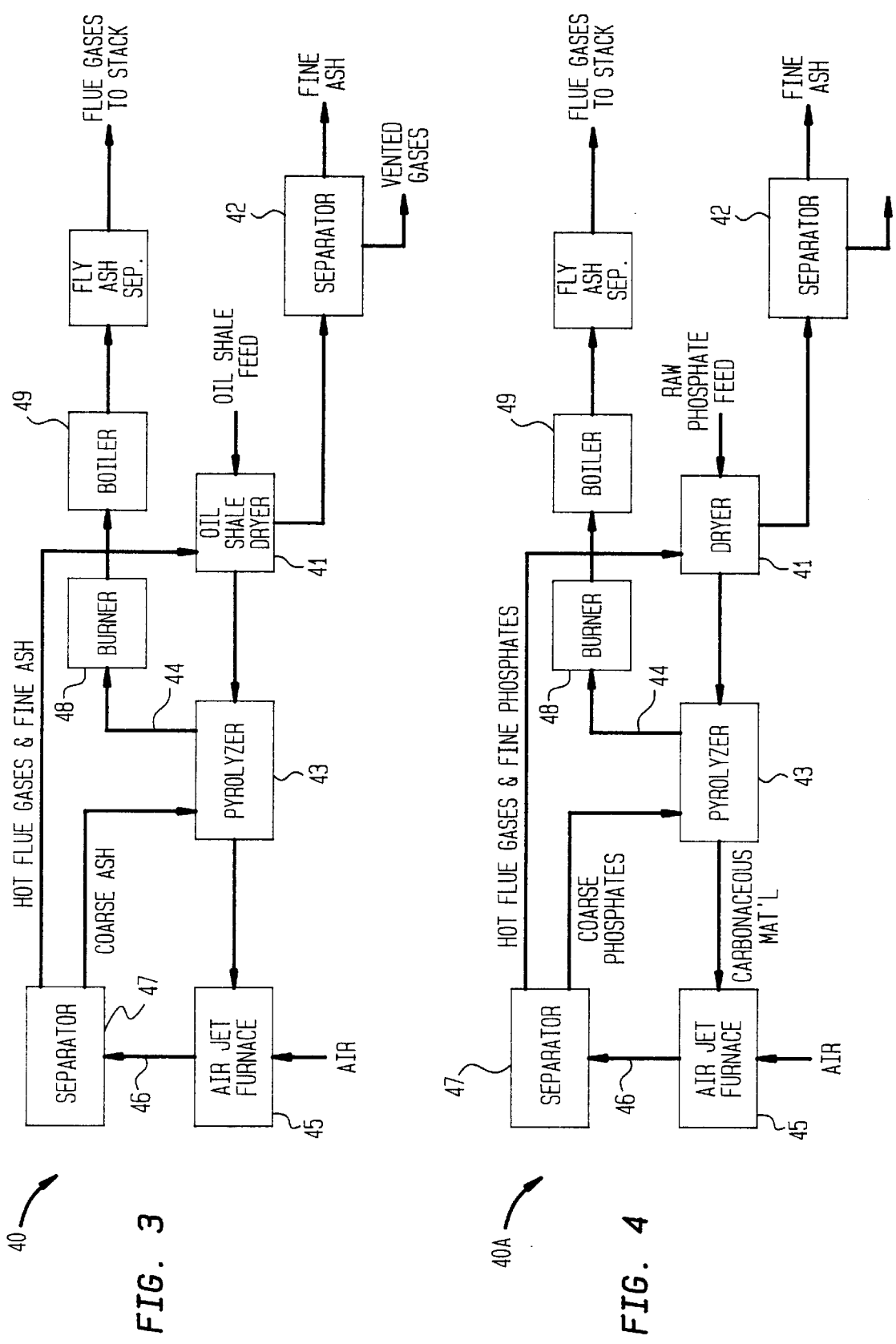

METHOD OF AND MEANS FOR PRODUCING COMBUSTIBLE GASES FROM LOW GRADE FUEL

This application is a continuation of application Ser. No. 08/318,191 filed Oct. 5, 1994, now U.S. Pat. No. 5,505,144 which is a continuation of Ser. No. 08/181,165 filed Jan. 13, 1994, now abandoned, which is a continuation of Ser. No. 08/082,821 filed Jun. 28, 1993, now abandoned, which is a continuation of Ser. No. 07/834,790 filed Feb. 13, 1992, now abandoned, which is a continuation-in-part of application Ser. No. 07/827,274 filed Jan. 29, 1992, now abandoned which is expressly incorporated by reference in its entirety.

TECHNICAL FIELD

This invention relates to a method of and means for producing combustible gases from low grade solid fuel such as oil shale and the like.

BACKGROUND OF THE INVENTION

Oil shale is found throughout the world and would constitute a plentiful and relatively inexpensive fuel if techniques were available for quickly and inexpensively processing the oil shale into combustible gases. One approach to processing oil shale into combustible gases is disclosed in U.S. Pat. No. 4,211,606 (the disclosure which is hereby incorporated by reference). In this patent, oil shale is heated in a dryer using clean, hot flue gases producing heated shale that is applied to a pyrolyzer. The heated shale is further heated in the pyrolyzer with hot ash to produce combustible products, and carbonaceous material that is added to a gasifier. Hot gases and steam are applied to the gasifier such that combustible gases are produced. The residue of the gasifier is extracted and applied to what the patent terms an air jet furnace, details of which are disclosed in U.S. Pat. No. 4,110,064 which is also incorporated by reference.

The air jet furnace produces combustion products in the form of hot flue gases whose major constituent is carbon dioxide, and ash particulate which is applied to a separator which separates the combustion products into a stream of hot coarse ash that is supplied to the pyrolyzer, and a stream of hot gas containing fine ash. The stream of hot gas and fine ash is applied to a separator that produces a stream of fine ash that is applied to the gasifier, and a stream of gases containing residual ash. The latter stream is applied to a further separator that produces the clean flue gases that serve to heat the shale in the dryer.

A less complex derivative of the apparatus described above has apparently been used in two plants in the U.S.S.R. in 1990 and 1991. As presently understood, the actual design eliminates the gasifier and the dryer. Oil shale is fed into a pyrolyzer wherein pyrolyzation takes place producing carbonaceous material after a predetermined residence time of the shale in the pyrolyzer. This material is supplied to an air jet furnace wherein combustion takes place producing hot flue gases, and particulate that is applied to a separator which separates the flow into a stream of coarse ash, and a stream of hot flue gases containing fine ash, such as fly ash. The stream containing the hot coarse ash is applied to the pyrolyzer which produces pyrolysis gas at a temperature in excess of 400° C. Such gas contains combustible products, steam and carbon compounds. The stream containing the combustible products from the pyrolyzer is applied, together with the stream of hot flue gases containing fine ash to a burner that is part of a combustion chamber of a boiler that produces steam that may be used for generating electricity.

The problem with a power plant utilizing this technique for burning oil shale is a reduction in thermal efficiency and available power caused by fouling of the heat transfer surfaces in the boiler caused by the entry of fly ash into the boiler, and by carbonate decomposition which results in increased energy consumption and increased carbon dioxide emission from the power plant. The air jet furnace must operate at high temperatures to obtain process stability. Such stability is achieved when the temperature at the output of the furnace is high enough so that the coarse ash added to the pyrolyzer has sufficient heat to both heat the oil shale in the pyrolyzer as well as to evaporate water and organic matter associated with the shale. It has been estimated that more than about two-thirds of the amount of fly ash entering the boiler is derived from the fine ash carried with the hot gases from the air jet furnace, and less than about one-third is derived from the combustible gases produced by the pyrolyzer.

Reducing the temperature of the furnace will reduce the amount of carbonate decomposed therein and improve carbondioxide emission from the power plant, but such reduction in temperature is achieved at the cost of increasing the circulation rate through the furnace which has the detrimental effect of increasing the parasitic losses of the power plant and consequent reduction in the overall efficiency of the plant. In addition to this, the usual problem of fouling of the heat exchange surfaces is still present requiring periodic mechanical cleaning with high pressure liquid to remove soft deposits, and complete shut down and manual scraping to remove hard deposits.

It is therefore an object of the present invention to provide a new and improved method of and means for producing combustible gases from low grade solid fuel which substantially overcomes or significantly reduces the disadvantages outline above.

BRIEF DESCRIPTION OF THE INVENTION

According to the present invention, combustible gases from a solid fuel are produced by pyrolyzing said fuel in a pyrolyzer which also produces the combustible gases and carbonaceous material. The carbonaceous material from the pyrolyzer is combusted in a furnace to produce combustion products that include hot flue gases and ash particulate. The combustion products are separated into a plurality of streams, one of which contains flue gases and fine ash, such as fly ash, and another of which contains hot coarse ash which is directed into the pyrolyzer. Finally, the stream of flue gases and fine ash is used to dry the fuel that is supplied to said pyrolyzer.

Because the fly ash and flue gases leaving the furnace do not enter the combustion chamber of the boiler, the efficiency of the boiler is not adversely affected, and down time for cleaning fouled heat exchange surfaces is reduced. Furthermore, because the fuel that enters the pyrolyzer is already heated, less heat has to be supplied by ash from the furnace. Consequently, the furnace can be operated at a lower temperature which reduces carbon dioxide emission from a power plant utilizing the invention. However, even so the temperature of the furnace can be adjusted so that sufficient carbonate will be decomposed in the pyrolyzer to ensure the capture of sulfur compounds during the combustion of gases exiting the pyrolyzer by by particulate originating from the pyrolyzer. Such capture is efficient because the temperature in the combustion chamber of the boiler is optimal for such a reaction, e.g., $CaCO_3 + \frac{1}{2} O_2 + SO_2 \rightarrow CaSO_4 + CO_2$, to take place. Furthermore, if preferred, the particulate reaching the combustion chamber of the boiler from the pyrolyzer can be used for facilitating the absorption of oxides of sulfur and/or other sulfur compounds originating from the combustion of other fuels in the combustion chamber which are rich in sulfur. Finally, the reduced temperature of the ash discharged from the dryer permits this ash to be handled using conventional low temperature equipment such as bag filters, electrostatic precipitators, etc.

BRIEF DESCRIPTION OF THE DRAWINGS

Embodiments of the present invention are shown by way of the example in the accompanying drawings wherein:

FIG. 1 is a block diagram which represents, in a schematic way, existing power plants for producing combustible gases from low grade solid fuel such as oil shale;

FIG. 2 is a block diagram of a modification of the apparatus shown in FIG. 1;

FIG. 3 is a block diagram of an embodiment of the present invention;

FIG. 4 is a block diagram of another embodiment of the invention in which organic material in phosphates is removed to produce improved phosphates.

DETAILED DESCRIPTION

Figure 5:
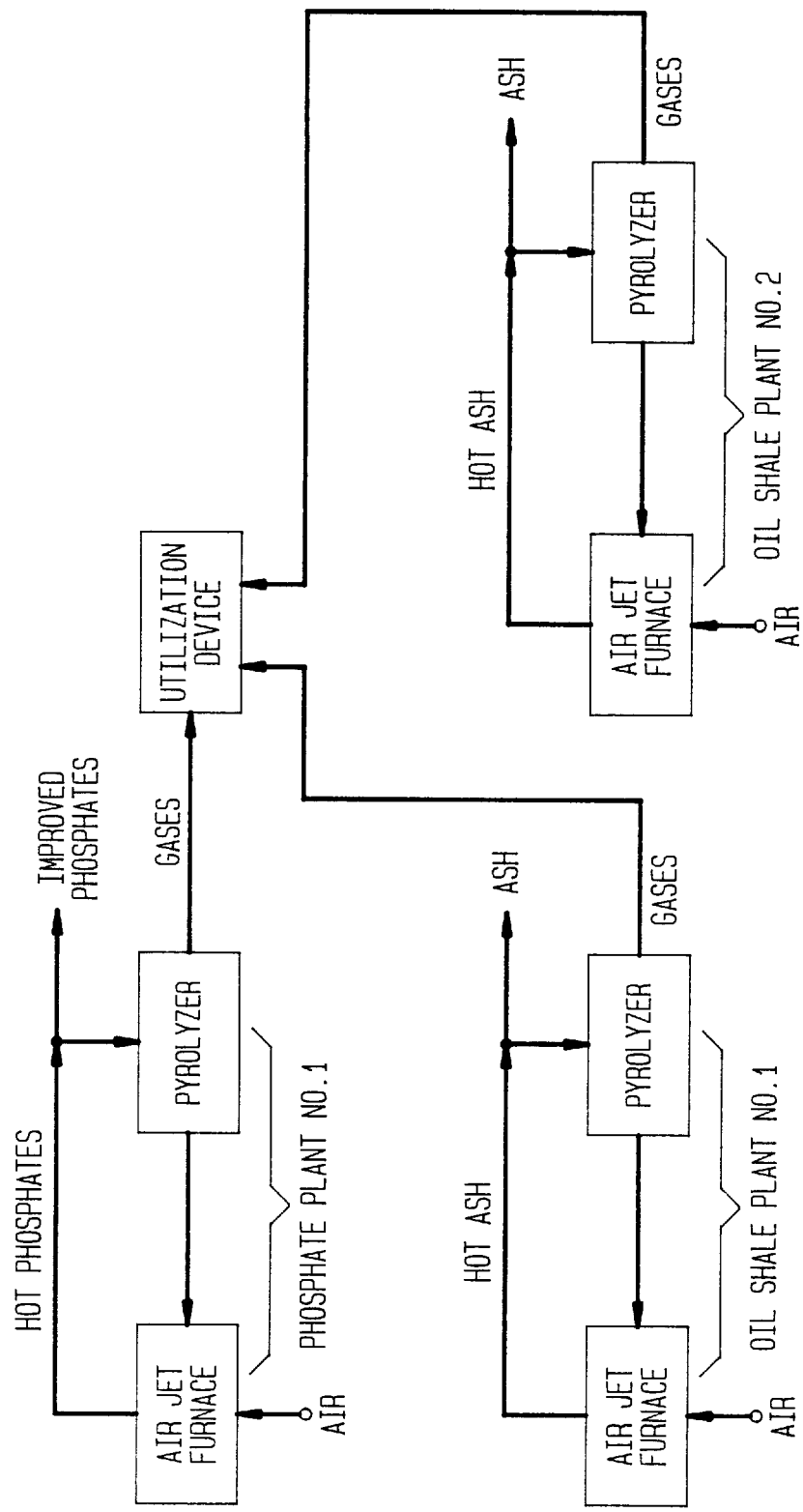
FIG. 5 is a block diagram of a modification of the embodiment of FIG. 4.

Referring now to FIG. 1, reference numeral 10 designates conventional apparatus for producing combustible products and gases from a low grade solid fuel such as oil shale. Ground oil shale is usually applied to oil shale hopper 12 having a screw feed device (not shown) for supplying shale from hopper 12 to dryer 13 that is supplied with clean flue gas that heats and dries the shale producing steam and other gases. The output of the dryer is applied to separator 15 which separates solids of the oil shale from the gases and applies the solids to pyrolyzer 14, the gases being vented to atmosphere. Pyrolysis takes place in pyrolyzer 14 under the influence of hot combustion products in the from of hot coarse ash applied to the pyrolyzer. In response, the pyrolyzer produces pyrolysis gases in the form of steam and combustible gases in excess of 400° C.

The carbonaceous material formed in pyrolyzer 14 is fed by a screw conveyer (not shown) to fluidize gasifier 17 which also receives hot combustion products in the form of fine ash. The contents of the gasifier are fluidized by the application of hot gases and steam; and the resultant product is supplied to air jet furnace 16 wherein combustion of the carbonaceous material takes place in the presence of ambient air supplied to the furnace. The outputs of the furnace are products of combustion comprising flue gases and particulate material which are applied to separator 18. Separator 18 is effective to divide the flow into at least two streams, one of which contains hot coarse ash and another of which contains hot flue gases and hot fine ash.

The first stream containing the hot coarse ash is applied to the pyrolyzer and supplies the heat by which the pyrolysis takes place. The other stream containing the hot fine ash is applied to separator 19 to separate most of the fine ash which is applied to the gasifier, and producing relatively clean gases that are applied to separator 20 which is effective to remove residual ash and produce clean hot gases that are applied to dryer 13. A burner (not shown) receives combustion gases from gasifier 17 and pyrolyzer 14, and combustion of these gases takes place in the combustion chamber of a boiler which produces steam used to generate electricity. The flue gases produced by the combustion chamber in the boiler are applied to a fine ash separator and the clean flue gases that exit the separator are applied to a stack.

In the apparatus indicated by reference 30 in FIG. 2, the dryer and gasifier have been eliminated to simplify the construction and operation of the equipment. In embodiment 40, shown in FIG. 3, which is presently considered to be the best mode of carrying out the invention, and which illustrates a power plant, oil shale is fed into dryer 41 usually from a hopper (not shown) wherein the shale is dried by reason of the application to the dryer of hot flue gases containing hot fine ash. After these gases and hot ash give up their heat to the shale, water in the shale is vaporized and passes with the cooled gases and cooled fine ash to separator 42 which is low temperature equipment, such as bag filters, or electrostatic precipitators, etc. The output of this separator are cooled gases that are vented, and cooled fine ash.

The heated and dried shale from dryer 41 is conveyed to pyrolyzer 43 wherein the shale is further heated in the absence of oxygen to produce combustible gases which exit through conduit 44, and carbonaceous material which is conveyed to air jet furnace 45 wherein the carbonaceous material is combusted with ambient air at a temperature lower than the temperature of air jet furnace 16 in embodiment 30. The products of combustion exit the furnace through conduit 46, such products constituting hot flue gases and ash particulate which are applied to separator 47. The latter separates the coarse ash which is fed to pyrolyzer 43 and part of which is disposed in an ash removal system. A stream containing hot fine ash and hot flue gases separated by separator 47 is applied to dryer 41.

The combustible gases that exit the pyrolyzer through conduit 44 are essentially clear of ash; and as a consequence, these gases burn cleanly in burner 48. Little ash build-up occurs in the combustion chamber and heat exchange surfaces of boiler 49. Because of this, the efficiency of the boiler is not adversely affected, and down time for cleaning fouled heat exchange surfaces is reduced.

Because the shale that enters pyrolyzer reactor 43 is already heated and dried in the dryer, less heat has to be supplied by the coarse ash from separator 47. Consequently, the furnace can be operated at a lower temperature which reduces carbon dioxide emission from the power plant utilizing the invention. However, even so, the temperature of the furnace can be adjusted such that sufficient carbonate will be decomposed in the pyrolyzer to ensure the capture of sulfur compounds during the combustion of combustible gases exiting the pyrolyzer by particulate coming from the pyrolyzer. Such capture is efficient because the temperature in the combustion chamber of boiler 49 is optimal for such a reaction, e.g., $CaCO_3 + \frac{1}{2} O_2 + SO_2 \rightarrow CaSO_4 + CO_2$, to take place. Furthermore, if preferred, the particulate reaching the combustion chamber of boiler 49 from pyrolyzer 43 can be used for facilitating the absorption of oxides of sulfur and/or other sulfur compounds originating from the combustion of other fuels in the combustion chamber which are rich in sulfur.

While the invention is described in connection with utilizing low grade fuel such as oil shale, the invention is applicable to other types of low grade fuel such as peat. Furthermore, while this specification refers to oil shale or other low grade solid fuel as material for use in the pyrolyzer, it should be understood that the oil shale or other low grade fuel may be mixed with or introduces into the pyrolyzer together with another fuel, such as residual oil, rich in sulfur. In such case, particulate from the pyrolyzer can be used to efficiently capture oxides of sulfur and/or other compounds during combustion of the pyrolysis gases. The other fuels rich in sulfur previously mentioned may be a solid, liquid, or gaseous. However, when the fuel is mixed or introduced into the pyrolyzer together with the oils shale, only solid for liquid fuel would be appropriate.

If the oil shale used is not of sufficient quality to provide the required temperature in the air jet furnace (presently, approximately 700° C. is considered optimum), coal or other fuels can be added to the air jet furnace for ensuring operation at the required temperature. Alternatively, or in addition, the air or gases entering the air jet furnace can be preheated by spent ash that exits the air furnace.

In addition to the fuels mentioned above, other fuels may also be used. For example, refuse derived fuel (RDF) can be used as well as unsegregated refuse. Peat is another source of fuel.

The present invention also provides a method of and means for improving raw phosphates (i.e., phosphates found in many places in the world containing more than about 1–1.5% by weight of organic material) by eliminating substantially all organic material. According to the invention, apparatus disclosed in the present application, or apparatus disclosed in U.S. Pat. No. 4,211,606 can be used. Alternatively, apparatus disclosed in U.S. Pat. No. 4,700, 639, the disclosure of which is hereby incorporated by reference, can be used. At present, the best mode of the present invention for improving raw phosphates, is apparatus disclosed in the present application, wherein a pyrolyzer converts most of the organic matter contained in the phosphates into gas.

Conventional methods of raw phosphate improvement can handle phosphates containing up to only 1 to 1.5% by weight of organic matter. Improved results can be obtained by baking the phosphates at a temperature of approximately 900° C. so that most of organic matter is consumed. Such baking, however, will not be sufficient to deal with phosphates having a higher organic matter content.

The preferred method for improving raw phosphates having higher organic content, according to the present invention, is to utilize at least a two-stage process of (1) pyrolysis and (2) baking. According to the present invention, pyrolysis is first carried out on the raw phosphates for converting organic matter contained in the phosphates into combustible gases which are extracted from the pyrolyzer and made available for combustion as shown in FIGS. 4 and 5. Alternatively, the combustible gases can be furnished to a utilization device other than the combustion chamber of a power plant.

Phosphates remaining in the pyrolyzer after pyrolyzing is effected are removed and baked in an air jet furnace which, preferably, is operated at a relatively high temperature, approximately 900° C., such that any organic material remaining in the phosphates is combusted, and/or any other processes requiring such a high temperature in the improvement process of the raw phosphates may take place. Consequently, the phosphates exiting the air jet furnace will contain only a relatively small amount of organic matter and are thus improved.

A portion of the improved phosphates exiting the air furnace is extracted as the product of the process, while a further portion is applied to the pyrolyzer for heating phosphates therein during the pyrolysis process. In other words, a portion of the particulate improved phosphates exiting the air furnace is supplied to the pyrolyzer in a manner similar to that in which the ash exiting the air furnace is supplied to the pyrolyzer in the previous embodiments of the present invention, or in the manner in which the apparatus disclosed in U.S. Pat. No. 4,211,606 provides heat for the pyrolysis process.

FIG. 5 shows the present invention used for producing improved phosphates and combustible gases that are used in a utilization device, which may be the combustion chamber of a power plant. Other uses for the combustible gases may include burning the gases in the combustion chamber of a gas turbine, or internal combustion engine such as a diesel engine that may drive a generator and produce power, or utilizing the gases as raw material in a chemical production line.

If the amount of organic matter in the phosphates reaching the air jet furnace from the pyrolyzer is insufficient for permitting the air jet furnace to operate at the high temperature required, coal or any other fuel can be added to the air jet furnace to ensure that the required high temperatures are achieved in the air furnace. Alternatively, a portion of the gases exiting the pyrolyzer can be added to the air jet furnace for ensuring that the required high temperatures are reached.

In a further embodiment of the present invention, a plurality of plants can be used for providing gases for a utilization device such as the combustion chamber of a power plant, or for other uses described above. When the gases are used to provide fuel for a power plant, one or a number of oil shale processing plants, analogous to the ones specified in the above described embodiment of the present invention or that described in U.S. Pat. No. 4,211,606 or in U.S. Pat. No. 4,700,639, can be used in conjunction with one or a number of raw phosphate processing plants described above as shown schematically in FIG. 6. In such a manner, raw phosphates, usually having a varying calorific value can be processed such that combustible gases exiting the raw phosphate processing plants, can be supplied to a combustion chamber for combustion to which gases exiting oil shale processing plants, usually having a reasonably fixed calorific value are also supplied. If preferred, the gases produced by the phosphate processing plants and the gases produced by the oil shale processing plants can be supplied to separate combustion chambers.

Alternatively, if some of the raw phosphates have a reasonably fixed calorific value, these phosphates can also be processed in a separate plant or plants, with the phosphates having a varying calorific value being processed in other processing plants. Gases produced from these processing plants can be supplied to a common combustion chamber, or to separate combustion chambers if preferred.

Furthermore, where the raw phosphates and oil shale are extracted from the same or adjacent layers (shale layers are often above or below phosphate layers), a single conveyer may be used for conveying the oil shale and/or phosphates to the appropriate processing plants. In such a way, separate conveyer systems are eliminated.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method comprising:
   a) pyrolyzing a sulfur bearing fuel together with oil shale containing calcium compounds to produce a combustible gaseous product stream and a carbonaceous residue product stream;

b) combusting said residue product stream with excess air at a temperature sufficient to produce a hot product stream containing hot gases and hot particulate at a temperature higher than the temperature of said gaseous product stream;

c) separating hot particulate from said hot product stream to produce a hot gas stream;

d) feeding back separated particulate to said pyrolyzer;

e) transferring heat from said hot gas stream to a gas supplied to a burner; and f) burning said combustible gaseous product stream in said burner.

2. A method according to claim 1 including using heat produced by the burner for generating power.

3. A method according to claim 1 wherein heat from said hot gaseous stream is transferred to a gas supplied to said burner by direct contact.

4. Apparatus comprising:

a) a pyrolyzer for pyrolyzing a sulfur bearing fuel together with oil shale containing calcium compounds to produce a combustible gaseous product stream and a carbonaceous residue product stream;

b) a furnace for combusting said residue product stream with excess air at a temperature sufficient to produce a hot product stream containing hot gases and hot particulate at a temperature higher than the temperature of said gaseous product stream;

c) a separator for separating hot particulate from said hot product stream;

d) means for feeding back separated hot particulate to said pyrolyzer;

e) a gas turbine having a compressor for compressing air, a burner for heating air compressed by said compressor, and a turbine responsive to exhaust from the turbine;

g) means for supplying said combustible gaseous product stream to said burner which burns said combustible gaseous product stream.

5. A method according to claim 1 wherein said sulfur bearing fuel is residual oil.

6. A method comprising:

a) pyrolyzing a sulfur bearing fuel together with oil shale containing calcium compounds to produce a combustible gaseous product and a carbonaceous residue product;

b) combusting said residue product with excess air to produce hot gases and hot particulate entrained in said hot gases;

c) separating hot particulate from said hot gases to produce substantially particulate-free hot gases;

d) supplying the separated hot particulate to the pyrolysis of step (a) above; and e) burning said combustible gaseous product in a burner of a power plant.

7. A method according to claim 6 wherein said sulfur bearing fuel is residual oil.

8. A method according to claim 6 wherein said power plant is a gas turbine.

9. A method according to claim 6 wherein said power plant is a diesel engine.

10. A method according to claim 6 wherein said power plant is an internal combustion engine.

* * * * *